United States Patent [19]
Biss

[11] Patent Number: 5,552,593
[45] Date of Patent: Sep. 3, 1996

[54] TEMPLATE OR RETICULE FOR QUALITY CONTROL OF A HEXAGONAL CODE HAVING AN ACQUISITION TARGET AND AN ALIGNMENT TARGET

[75] Inventor: Charles E. Biss, Williamson, N.Y.

[73] Assignee: PSC Inc., Webster, N.Y.

[21] Appl. No.: 443,172

[22] Filed: May 17, 1995

[51] Int. Cl.$^6$ ................................................. G06K 21/06
[52] U.S. Cl. ........................................ 235/495; 235/494
[58] Field of Search .................................... 235/494, 495

[56] References Cited

U.S. PATENT DOCUMENTS 4,149,070   4/1979   Pastorious .............................. 235/495

Primary Examiner—Harold Pitts
Attorney, Agent, or Firm—Joseph F. Murphy

[57] ABSTRACT

A print quality, see-through template determines if a hexagonal coded symbol area imprinted on a package falls within allowable limits. The template includes boundaries corresponding to a minimum allowable coded symbol areas and boundaries corresponding to a maximum allowable coded symbol areas. When placed on top of the coded symbol area of the package, it can be determined if the encoded symbol area falls within the bounds shown on the template. The template also includes alignment hexagons for lining up to orientation hexagons that exist on hexagonal code labels. Once these hexagons are lined up, a bull's eye center on the coded symbol area is compared to a dual-size, inverse-color bull's eye on the template, to ensure that the bull's eye meets the specified requirements of the hexagonal code.

The template can also be used with a magnifier to make it easier for an operator to align the alignment hexagons on the template with the orientation hexagons on the encoded symbol area, and to allow for the bull's eye pattern to be viewed at a greater size.

28 Claims, 8 Drawing Sheets

```
All dimensions in inches unless otherwise stated.
                    Tolerance
     C     0.04015748  0.0023622
     T     0.02637795  0.00393701
     D     0.30511811  0.00393701  0.15255906

@ 10x=>    0.362    0969    1.417   2.024   2.472   3.079
   Dia.=>    0.036    0.097   0.142   0.202   0.247   0.308
   GROWTH    0.018    0.048   0.071   0.101   0.124   0.154
             R1.      R2      R3      R4      R5      R6
   SHRINK    0.022    0.044   0.075   0.097   0.128   0.150
   Dia.=>    0.044    0.089   0.150   0.194   0.255   0.300
   @ 10x=>   0.441    0.890   1.496   1.945   2.551   3.000
          0.00393701 -0.00393701  0.00393701 -0.00393701  0.00393701 -0.00393701
```

"Finder" or "Bulls-eye" Position in Relation To Hexagons
Hexagon Dimension (Initial size in mm)    L = 25.5

Hex Width   W=L/29=0.879          Vertical Spacing   Y=(1.5/1.7320508)W=0.762
                  0.036 inches                              0.030 inches
Hex Height  V=(2.0/1.7320508)W=1.015
                  0.040 inches

```
                     mm     inches                          mm     inches
   Left Dimension=  12.750  0.502    Top Dimension=    12.565   0.495
   Right Dimension= 13.629  0.537    Bottom Dimension= 12.565   0.495
                    26.379  1.039                      25.130   0.989
                     0.879  0.035                       0.760   0.030
   Overall Tolerance= 1.470 0.058    Overall Tolerance= 1.400   0.055
   Outer Size Maximum  Width= 1.096                  Height=    1.044
   Outer Size Maximum  Width= 0.981                  Height=    0.934
```

Center of "Finder" from Left Edge of Maximum = 0.531
Center of "Finder" from Left Edge of Minimum = 0.473
Center of "Finder" from Top Edge of Maximum = 0.522
Center of "Finder" from Top Edge of Minimum = 0.467

FIG. 7

All dimensions in inches unless otherwise stated.

|   |            | Tolerance  |            |
|---|------------|------------|------------|
| C | 0.04015748 | 0.0023622  |            |
| T | 0.02637795 | 0.00393701 |            |
| D | 0.30511811 | 0.00393701 | 0.15255906 |

| @ 10x => | 0.362 | 0.969 | 1.417 | 2.024 | 2.472 | 3.079 |
|----------|-------|-------|-------|-------|-------|-------|
| Dia. =>  | 0.036 | 0.097 | 0.142 | 0.202 | 0.247 | 0.308 |
| GROWTH   | 0.018 | 0.048 | 0.071 | 0.101 | 0.124 | 0.154 |
|          | R1    | R2    | R3    | R4    | R5    | R6    |
| SHRINK   | 0.022 | 0.044 | 0.075 | 0.097 | 0.128 | 0.150 |
| Dia. =>  | 0.044 | 0.089 | 0.150 | 0.194 | 0.255 | 0.300 |
| @ 10x => | 0.441 | 0.890 | 1.496 | 1.945 | 2.551 | 3.000 |

0.00393701 -0.00393701 0.00393701 -0.00393701 0.00393701 -0.00393701

"Finder" or "Bulls-eye" Position in Relation To Hexagons
Hexagon Dimenson (Initial size in mm)   L= 25.5

Hex Width   W=L/29=0.879           Vertical Spacing   Y=(1.5/1.7320508)W=0.762
                       0.036 inches                                 0.030 inches
Hex Height  V=(2.0/1.7320508)W=1.015
                       0.040 inches

|                    | mm     | inches |                    | mm     | inches |
|--------------------|--------|--------|--------------------|--------|--------|
| Left Dimension=    | 12.750 | 0.502  | Top Dimension=     | 12.565 | 0.495  |
| Right Dimension=   | 13.629 | 0.537  | Bottom Dimension=  | 12.565 | 0.495  |
|                    | 26.379 | 1.039  |                    | 25.130 | 0.989  |
|                    | 0.879  | 0.035  |                    | 0.760  | 0.030  |
| Overall Tolerance= | 1.470  | 0.058  | Overall Tolerance= | 1.400  | 0.055  |
| Outer Size Maximum | Width= | 1.096  |                    | Height=| 1.044  |
| Outer Size Maximum | Width= | 0.981  |                    | Height=| 0.934  |

Center of "Finder" from Left Edge of Maximum = 0.531
Center of "Finder" from Left Edge of Minimum = 0.473
Center of "Finder" from Top Edge of Maximum = 0.522
Center of "Finder" from Top Edge of Minimum = 0.467

FIG. 8
Draw Hexagon Outlines at the following locations referenced from the center of the "Finder" to the Center of the Hexagon - in inches:
|     | X       | Y      |     | X       | Y       |      | X       | Y       |
|-----|---------|--------|-----|---------|---------|------|---------|---------|
| H1= | -0.1212 | 0.2099 | H5= | -0.2077 | 0.0000  | H9=  | -0.1212 | -0.2099 |
| H2= | -0.0865 | 0.2099 | H6= | 0.2077  | 0.0000  | H10  | 0.1039  | -0.1799 |
| H3= | -0.1039 | 0.1799 | H7= | 0.2250  | -0.0300 | H11= | 0.1212  | -0.2099 |
| H4= | -0.2250 | 0.0300 | H8= | -0.1385 | -0.1799 |      |         |         |
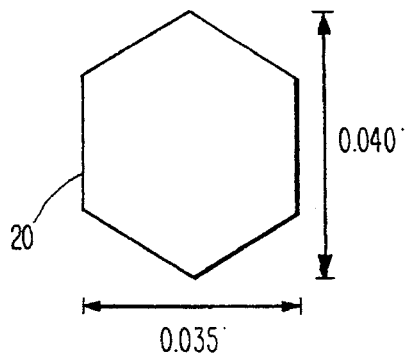
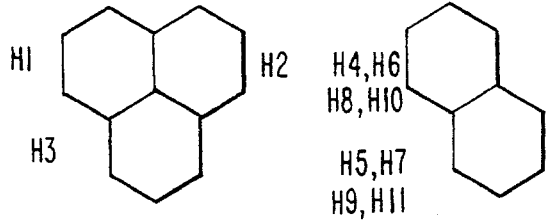
Patterning of Aligment Hexagons

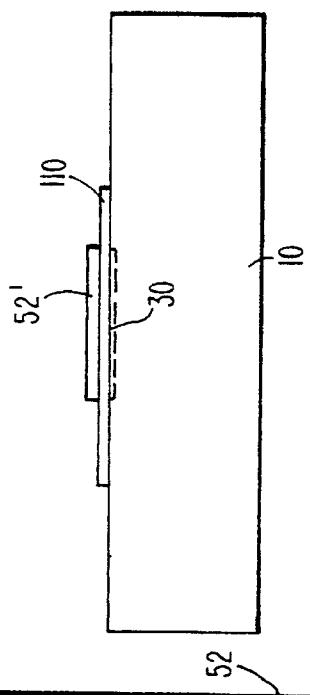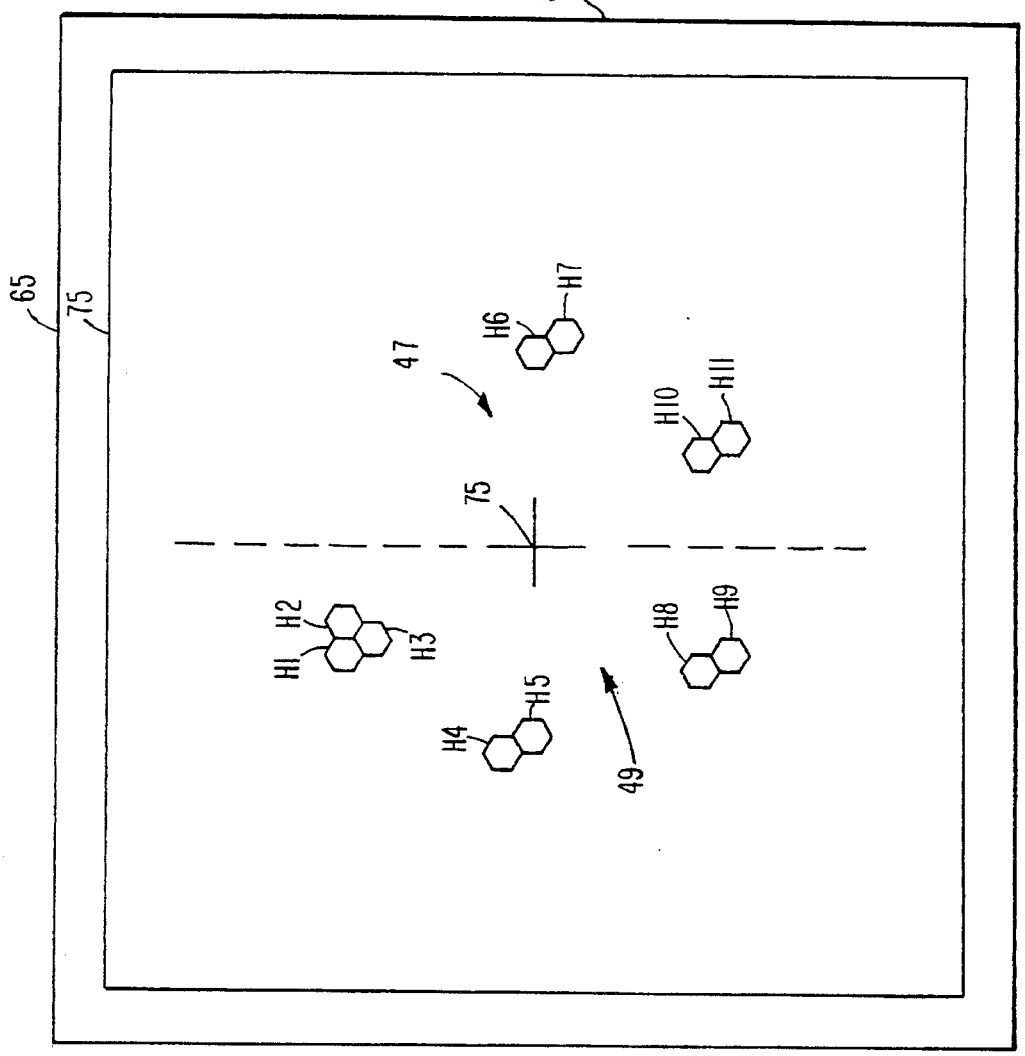

TEMPLATE OR RETICULE FOR QUALITY CONTROL OF A HEXAGONAL CODE HAVING AN ACQUISITION TARGET AND AN ALIGNMENT TARGET

BACKGROUND OF THE INVENTION

1. Field of the Invention

The invention relates to a reticule or template for judging the print quality of a particular pattern used for finding an encoded pattern or symbol. More specifically, the invention relates to a reticule or template having a pattern of concentric rings or other geometrical shapes in an opposite-color arrangement with respect to a pattern used as an orientation target on a symbol, for determining if the symbol, such as a hexagonal code symbol, meets predetermined specifications.

2. Description of the Related Art

Various types of symbol codes are used on merchandise, such as boxes, letters, packages, etc., for encoding pertinent information about an article of merchandise. For example, universal product codes (also known as "bar codes") are typically placed on an outer surface of the merchandise in order to encode information related to the merchandise in a point-of-sale transaction. An example of such encoded information would be the type of merchandise.

Based on the scanned bar code, a memory is accessed at the point-of-sale location to determine the cost of the scanned article of merchandise. This determination is based on the decoded bar code information that identifies the type of merchandise being sold. For example, based upon a decoded sequence of numbers that correspond to the bar code on an article of merchandise, a lookup table storing the current price of the merchandise can be accessed.

Universal product codes (UPC) typically lack the data density in order needed for storing detailed information concerning the object on which the code is affixed. For example, lines of a UPC bar code vary in a range from about ⅛" to 1" in height, and from about 10 to 52 mils in thickness. For UPC bar codes, the spacings between the lines making up the bar code may be of various widths. The variations in the spacings are one element in determining the bar code characters making up the bar code. Bar code information is read by illuminating the bars and spacings in a sequential manner. The bars absorb light and the background spacings reflect light. The pattern of these reflections and nonreflections is sensed by a bar code scanner.

Conventional UPC bar codes require a large amount of space to encode detailed information concerning the article on which the bar code is carried. Therefore, other types of codes have been developed which encode a greater amount of information onto a smaller area. For example, U.S. Pat. No. 3,553,438 discloses wedged-shaped coded elements, U.S. Pat. No. 3,971,917 discloses concentric black and white bit-encoded rings, U.S. Pat. No. 4,286,146 discloses information encoded into contiguous squares and rectangles, and U.S. Pat. No. 4,488,679 discloses a densely packed data field of dots for encoding information.

The size and speed of modern conveyor systems, which carry packages of varying sizes with labels of encoded information affixed thereon, has created a need to utilize small, inexpensive and compact labels. U.S. Pat. No. 4,998,010 describes one such labeling approach, using a large number of contiguous hexagons within a 1"×1" area. FIG. 1 shows a typical hexagonal coded symbol area 30, with a bull's eye center area 35 and a plurality of hexagons 20 placed at strategic locations outside of the bull's eye center area 35. The bull's eye is used as a locator as discussed further herein. The bull's eye is also used for alignment purposes before the encoded information that corresponds to the hexagons 20 can be electro-optically scanned. Once a hexagonal-code scanner is aligned with the bull's eye pattern 35, the information corresponding to the plurality of hexagons 20 can be read.

FIG. 1 also shows a maximum allowable area of the hexagonal coded symbol area 30, as given by lines 34H, 34V, and a minimum allowable area of the hexagonal coded symbol area 30, as given by lines 33H, 33V.

FIG. 2 shows a blow-up of an area of the contiguous hexagons 20 that are make up part of the encoded information in the hexagonal coded symbol area 30. As can be seen from FIG. 2, hexagonal shapes are well suited for encoding a large amount of information into a small area. The hexagons 20 fit within a "tiled array", with no wasted space between the hexagons 20. Referring back to FIG. 1, the total area that the hexagonal coded symbol area 30 encompasses is approximately 1"×1" (0.981"×0.981" square using the minimum allowable space within lines 34H, 34V of FIG. 1, 1.096"×1.096" square using the maximum allowable space within lines 33H, 33V of FIG. 1). The bull's eye center circle 44 typically is not located at the midpoint of the hexagonal coded symbol area 30.

Within the approximately 1"×1" code symbol region, there is room for about 888 hexagons. Each of those 888 hexagonal areas is set to have either a black interior color (i.e, inked hexagon) or a white interior color (i.e., non-inked hexagon). This type of encoding allows a large amount of data to be encoded within a very small area, and is well-suited for mail and package delivery services, which must accommodate packages and letters of all sizes. To be able to trace a package or letter through during the delivery process, there is a need to encode information concerning how the package is to be delivered, whether the package is fragile and/or needs special handling requirements, whether the package needs to be kept in a special environment during shipping (e.g., temperature or humidity restrictions), etc.

A hexagonal encoding system such as that described above was developed by United Parcel Service (UPS), and is used extensively by UPS and others in determining the status of packages as they are sent from an origination location, through a series of intermediate locations, and finally on to a destination location.

When affixing the hexagonal-encoded labels onto packages in a conveyor-type environment, care must be taken so that the labels are properly affixed to their respective packages. In addition, misalignment of the bull's eye center area may result in the hexagons of the hexagonal coded symbol area not being properly read by a hexagonal code scanning device or the hexagonal code scanning device not becoming aligned with the acquisition target (bull's eye). In either case, the scanner would not properly acquire the target and could not scan the hexagons making up the hexagonal coded symbol area.

In such a system, the bull's eye provides a finder pattern. Once the pattern is found, the code can be read. If the elements of the finder pattern vary too much in size (e.g., the print quality is not good), an imaging device might not find the bull's eye. If the bull's eye is not found, the scanner, which reads the symbol outward from the center of the hexagonal coded symbol area, cannot acquire the coded symbols and therefore cannot read them.

Boxes which become tilted produce an optically skewed image. If the bull's eye is within specifications, image processing techniques can be used to correct for the tilting. However, such correction is not possible if the bull's eye is not within specifications. Thus, there is a need to have a good tool for verifying a bull's eye within specifications.

U.S. Pat. Nos. 4,422,241, and 4,607,433, both invented by David Meeker, disclose a transparent plate mark locator for determining whether a postage indication on an envelope is within appropriate specified requirements. U.S. Pat. No. 4,149,070, invented by Louis Pastorius, discloses a device used to inspect a plurality of bars and spaces of a UPC bar code by comparing the sizes of the bars with a predetermined pattern of the bars.

In the Pastorius patent, the alignment of the bars on the template is used to determine if the bars of the actual bar code are correct. Pastorius does not disclose aligning the code with an "alignment" object before comparing the bars on the bar code with the predetermined bars on the template. In the Meeker patents, there is no direct overlay of a specified pattern on top of a similar pattern on the template. Meeker employs edge indications to line up with an envelope in order to determine if a postage label is within an allowable area as drawn on the template.

Accordingly, it is desirable to have a simple and inexpensive device that allows one to perform quality control of polygonal codes having acquisition targets, in order to determine, prior to scanning, if the print quality of the code symbol is adequate so that the code symbol can be found and read.

SUMMARY OF THE INVENTION

In accordance with the above limitations of the related art, it is an object of the invention to provide a template for determining if a symbol has a proper acquisition target. It is a further object of the invention to provide a template useful for determining if a symbol is of proper size and shape.

These and other objects can be achieved using a template in cooperation with a symbol having an acquisition target and an orientation target. The acquisition target includes a first alternating pattern of contrasting colors and a first predetermined pattern of a predetermined color. The template according to the invention includes a substantially transparent sheet having a top surface and a bottom surface. The template according to the invention also includes an acquisition pattern including a second alternating pattern of contrasting colors on the top surface of the transparent sheet, with the second alternating pattern being in a reverse color relationship with respect to the first alternating pattern. The template further includes an alignment pattern including the predetermined pattern having a second predetermined color, with the second predetermined color being in a reverse color relationship with respect to the first predetermined color. When the alignment pattern is aligned over the orientation target, the structure of the symbol meets the specification if the acquisition target of the symbol also aligns with the acquisition pattern on the template.

Also according to the invention is provided an apparatus for testing an encoded symbol having an acquisition target and an orientation target. The acquisition target includes a first alternating pattern of contrasting colors and the orientation target includes a first predetermined pattern of a predetermined color. A template according to the invention is made out of a substantially transparent material and has a top surface and a bottom surface. The template further includes an acquisition pattern including a second alternating pattern of contrasting colors on the top surface of the transparent sheet, with the second alternating pattern being in a reverse color relationship with respect to the first alternating pattern. The template further includes an alignment pattern having the predetermined pattern with a second predetermined color. The second predetermined color is in a reverse color relationship with respect to the first predetermined color. The template according to the invention also includes magnification means for providing a predetermined amount of magnification. Thus, when the alignment pattern of the template is aligned over the orientation target of the encoded symbol by an operator looking through the magnification means to the template on top of the symbol, the structure of the symbol meets the specification if the acquisition target of the symbol also aligns with the acquisition pattern on the template.

BRIEF DESCRIPTION OF THE DRAWINGS

In describing a method and an apparatus according to the invention, reference is made to the following description and accompanying drawings, in which:

FIG. 7 gives detailed information concerning the locations of the orientation hexagons and the concentric ring sizes for both shrinkage and growth sides of the bull's eye pattern, as well as the locations of the minimum and maximum label size lines on the template according to the invention;

FIG. 8 shows a typical size of a hexagon used to encode information in a hexagonal-coding scheme, as well as the precise locations of the orientation hexagons on the template according to the invention;

FIG. 9 shows locations of orientation hexagons of the template according to the invention; and FIG. 10 shows a side view of a template according to the third embodiment on top of a 10× magnification lens, which itself is on top of a hexagonal coded symbol area.

DETAILED DESCRIPTION OF THE PREFERRED EMBODIMENTS

Figure 3:
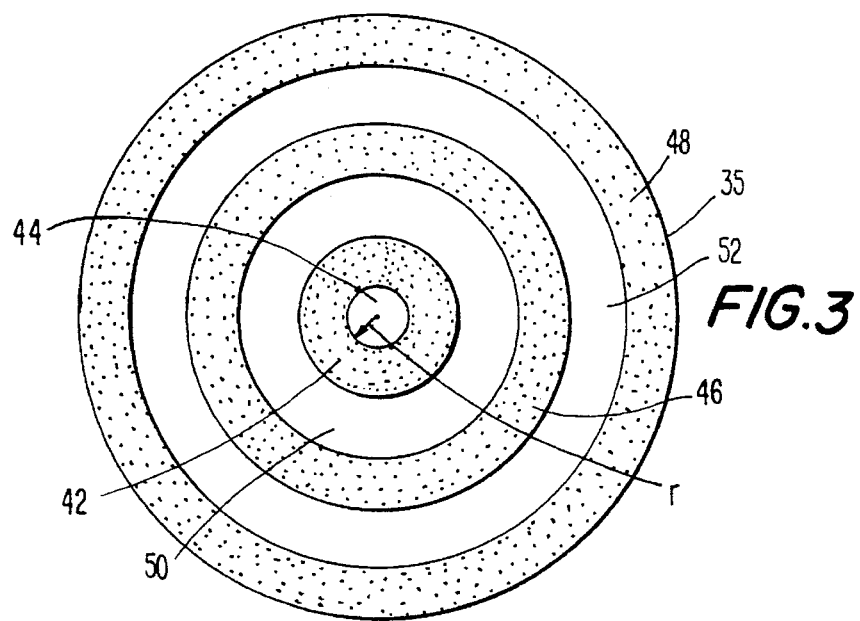
FIG. 3 is a diagram of the acquisition target bull's eye pattern.

Referring now to FIG. 3, there is shown a bull's eye pattern 35 that is used to allow a scanner to find a hexagonal code. The acquisition target 35, or bull's eye, includes a plurality of concentric rings of contrasting reflectivities, which will yield a periodic video signal when scanned in a linear manner. The bull's eye 35 also includes a center circle 44. The center circle 44 is shown having a white interior, and has a radius r that has an allowable range between a minimum radius $r_{min}$ and a maximum radius $r_{max}$ (not shown).

As shown in FIG. 3, the contrasting reflectivities include alternate white and black rings, although other colors may be used to obtain the desired contrast between the concentric rings. The bull's eye acquisition target 35 is made up of a white center circle 44, a first black concentric ring 42, a second white concentric ring 50, a third black concentric ring 46, a fourth white concentric ring 52, and a fifth black concentric ring 48.

Figure 1:
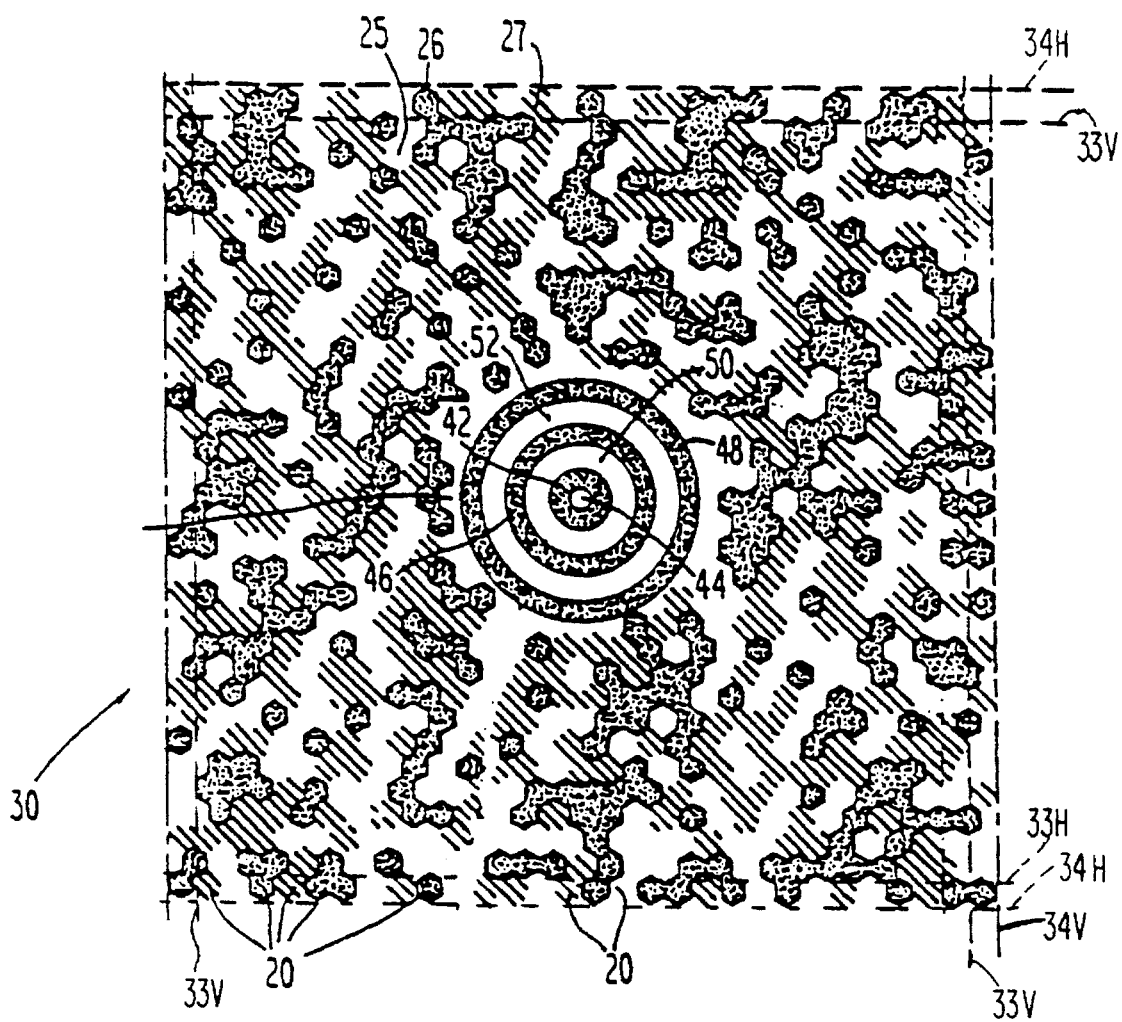
FIG. 1 is a diagram of a conventional hexagonal-code label with a bull's eye acquisition target located somewhere on the label.

Once a reference point for the hexagonal code has been determined by a successful acquisition of the bull's eye pattern 35 by an electro-optical scanner, the data array of hexagons can be successfully processed for decoding. Information that corresponds to the white and black hexagons surrounding the bull's eye pattern 35 can be obtained by scanning the approximately 1"×1" square region 30 as shown in FIG. 1. A raster scan or other appropriate scanning process can be used. The scanning of the hexagonal coded symbol area 30 is typically done with a Charge-Coupled Device (CCD) array.

Referring back to FIG. 2, each of the hexagonal cells 20 are information encoding units formed by closed broken lines 22. The hexagonal cells 20 are arrayed in a predetermined two-dimensional pattern on an optically readable label. Configurations other than hexagons, such as polygons, rectangles, squares, etc., can also be used to encode the data. The adjacent hexagons may be totally contiguous, partially contiguous, or noncontiguous on the optically readable code symbol.

While the system according to the invention will be described below with reference to "contiguous" hexagons, it will be known to those of ordinary skill in the art that the invention would work equally as well with the other types of encoding patterns described above.

"Contiguous hexagons" are arranged with the geometric centers of adjacent hexagons 20 lying at the vertices of a predetermined two-dimensional array. The borders of these hexagons 20 touch the borders of immediately adjacent hexagons 20, as can readily be seen from FIG. 2. Thus, the "contiguous hexagon" pattern is advantageous because it does not leave any interstitial spaces between the hexagons 20, allowing a maximum number of hexagons to be encoded into a particular region (such as a 1"×1" square area).

In each of the embodiments described herein, hexagons are used for the shape of each of the encoded areas since hexagons can be packed more densely in a particular area than other types of polygons. For example, the corners of "squares" are difficult to resolve by an optical scanner, often requiring further optical resolution in order to read each of the squares of a multi-square encoded pattern. Circles would be optimal for purposes of optical resolution, but of course it is impossible to have adjacent circles without having a large area of wasted space between the contiguous circles. Hexagons permit optimum packing of information, as compared to other types of geometric patterns. A pattern of contiguous hexagons will hereinafter be also referred to as a "honeycomb" pattern.

The individual hexagons forming the honeycomb pattern are each set to one of a plurality of contrasting reflectivities corresponding to information being encoded by these hexagons. For the purposes of simplifying the description of the system according to the invention, it will be assumed that each of the hexagons can be set to either a black interior or a white interior. Thus, each hexagon is capable of storing $\log_2 2 = 1$ bit of information.

Figure 2:
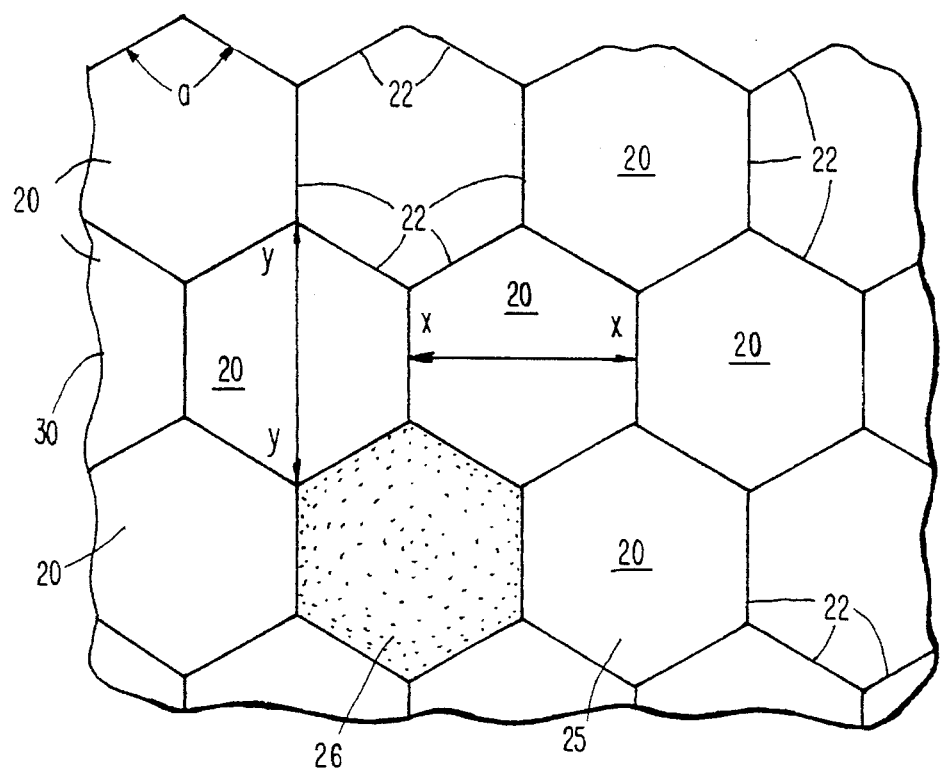
FIG. 2 is a diagram of part of the hexagonal honeycomb pattern that is used to encode information.

FIG. 2 shows only a portion of an electro-optically scannable hexagonal coded symbol area 30. The non-acquisition target portion of the hexagonal coded symbol area 30 includes a plurality of adjacent printed hexagonally-shaped cells 20, formed in a honeycomb pattern. Each of the hexagonal cells 20 includes six sides 22 of equal length. The interior angles "a" of each of the hexagons 20 are equal to 120 degrees. Each hexagon 20 has a maximum vertical axis y-y, and each hexagon 20 has a maximum horizontal axis x-x. The x-x axis is smaller than the y-y axis due to the geometry of the hexagon 20.

As can be seen from FIG. 2, the hexagons 20 are aligned in staggered and overlapping vertical columns, with alternate vertically spaced hexagons 20 having co-linear y-y axes. Referring now to FIG. 1, the y-y axes of each of the hexagons 20 are parallel to the minimum and maximum vertical borders 33V, 34V of the hexagonal coded symbol area 30. Also, the x-x axes of each of the hexagons 20 are parallel to the minimum and maximum horizontal borders 33H, 34H of the symbol area 30. Referring back to FIG. 2, each of the hexagons 20 making up the honeycomb pattern are set to either a white interior 25, or a black interior 26.

The hexagons 20 are typically formed by a printing process which prints each of the hexagons having one of a plurality of optical properties, i.e., each hexagon is colored either white or black. The particular shades of black and white are selected to achieve optimum contrast for ease of identification by an electro-optical sensor. In addition, a gray level can be used as a third optical color, which falls approximately equally between the optical properties of the respective white and black colors, to thereby allow more information to be stored in a single hexagon. Other color shades may also be used to encode more information content into one hexagon.

An area having hexagonal coded symbols can printed directly onto a surface of a package. The alignment of the hexagons 20 is critical, and care must be taken in the printing process to ensure that the y-y axes of the hexagons 20 forming the honeycomb pattern are parallel to the vertical sides 33V, 34V of the label 30, and that the x-x axes of the hexagons 20 forming the honeycomb pattern are parallel to the horizontal sides 33H, 34H of the hexagonal coded symbol area 30, as can be seen from FIG. 1.

When reading the information of the plurality of hexagons comprising an area having hexagonal coded symbols, it is necessary to have a sharp color contrast between adjacent hexagons. If the package has a good white background, then white hexagons can be produced by the absence of ink that is provided for the black hexagons.

In the hexagonal coding scheme as shown in FIG. 1, the hexagons making up the encoded information surround the acquisition target 35. The acquisition target 35 includes a plurality of concentric rings that form a bull's eye pattern. The acquisition target 35 is preferably not located at or near the geometric center of the hexagonal coded symbol area 30, in order to facilitate identifying its top/bottom and left/right orientations. However, the acquisition target 35 should not be located too close to an edge (33V, 33H, 34V, 34H) of the hexagonal coded symbol area 30. That way, the acquisition target 35 will be less susceptible to becoming torn or otherwise damaged as the package to which the hexagonal coded symbol area 30 is affixed is handled during the shipping of the package. Also, the size of an image buffer needed in an electro-optical scanner to store the data from the hexagonal coded symbol area 30 before the acquisition target 35 is identified is minimized by having the acquisition target 35 not at or near the edges of the hexagonal coded symbol area 30.

As shown in FIG. 3, five alternating black and white concentric rings form the bull's eye pattern 35. However, any suitable number of rings can be used as an acquisition target (i.e., between four and six rings) in the UPS hexagonal encoding scheme.

A pattern correlating technique is used to match a computed pattern of where the concentric rings are expected to be with the pattern being read. When a match occurs, the acquisition target 35 has been correctly located.

The acquisition target 35 may be of any overall diameter smaller than the hexagonal data array, to provide an area which may be as much as 25%, but is preferably about 7% of the approximately 1"×1" square area that makes up the hexagonal coded symbol area 30. Preferably, the bull's eye pattern 35 is sized as small as possible, since the area it occupies on the hexagonal coded symbol area 30 cannot carry encoded information. In order to have a 7% area taken up by the bull's eye pattern 35, the diameters of the concentric rings are selected so that the outside boundary of the external ring 48 (see FIG. 3) is about 7.45 millimeters.

The width of each of the concentric rings is preferably about the same as the side-to-side (x-x axis of FIG. 2) dimensions of the hexagons 20, in order to facilitate resolution, but this need not necessarily be so. Each concentric ring making up the acquisition target 35 has a minimum allowable ring width and a maximum allowable ring width, according to UPS hexagonal code specifications. The minimum allowable ring width is approximately 0.022", and the maximum allowable ring width is approximately 0.061".

Although the acquisition target 35 is shown as a bull's eye pattern, the acquisition target 35 may take a form other than concentric rings, such as spirals or hexagons, rectangles, squares, triangles and other geometric shapes, so long as linear sections through the acquisition target 35 will create regular, predetermined and identifiable color transitions. That way, identifiable color transitions can readily be sensed by an electro-optic sensor that scans across the acquisition target 35, and can be measured by a suitable filter resident in the sensor.

A target of concentric rings is the preferred geometric pattern for the acquisition target 35 because a return signal generated by a scan through the bull's eye center has a frequency which is the same when sections are taken in any azimuthal direction when cutting through the center of the concentric rings. This approach allows for a simpler identification of the reference position of the hexagonal coded symbol area 30, and allows locating the acquisition target 35 with a one-dimension search of the analog or digital output of the electro-optical scanner.

Allowing either a white or black color interior for each of the hexagons making up the honeycomb pattern corresponds to one bit of information (i.e., $\log_2 2$) that can be encoded for each of the approximately 888 hexagons in the approximately 1"×1" square hexagonal coded symbol area 30. Therefore, 888 bits of information can be encoded into this area. If a gray color is also used as a possible interior color for the hexagons, then each hexagon can hold $\log_2 3$ bits of information, allowing for about 1400 bits of information to be stored in the hexagonal coded symbol area 30. The gray-colored hexagons 20 are shown as the cross-hatched areas 27 in FIG. 1, along with the white-colored hexagons 25 and the black-colored hexagons 26.

For every hexagonal coded symbol area, there must be an acquisition target (i.e, a bull's eye) located somewhere inside the area, and a number of "orientation" hexagons at predetermined locations with respect to the bull's eye center.

The orientation hexagons at the predetermined locations all have black-colored interiors, and are analogous to the guard bars used in UPC bar codes. All UPC bar codes have start bars, stop bars, and bars in the middle of the bar codes, known respectively as the left guard pattern, the right guard pattern, and the center guard pattern. The orientation hexagons are needed so that the hexagonal code scanner can scan the black-interior orientation hexagons at the predetermined locations after acquiring the acquisition target to ensure that the hexagonal coded symbol area contains a properly encoded hexagonal code.

Figure 4:
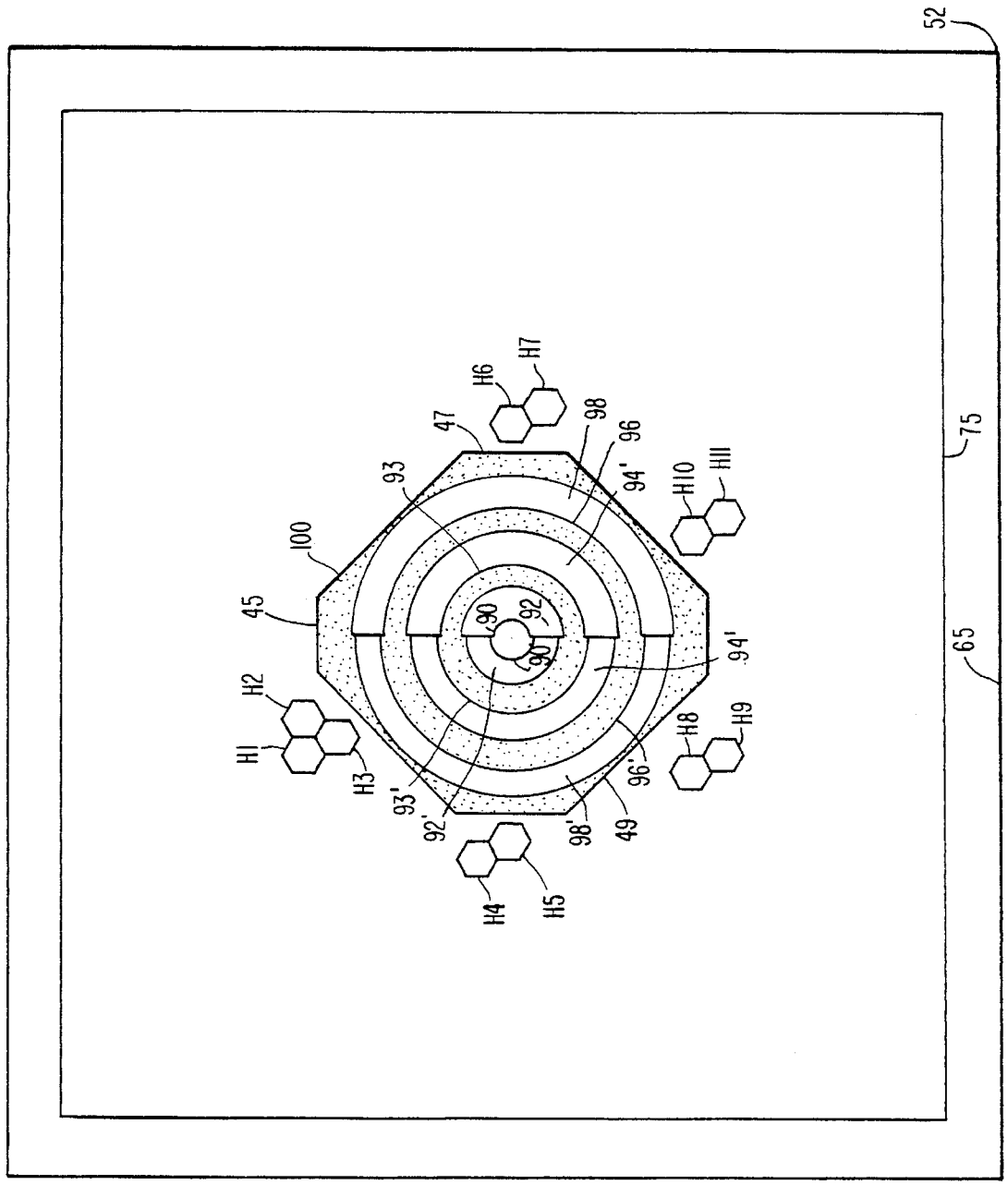
FIG. 4 is a diagram of the reticule or template according to a first embodiment of the invention.

The system according to the invention is shown in FIG. 4. In FIG. 4, there is shown a template or reticule 52 according to the invention with a dual-size bull's eye pattern 45. The bull's eye pattern 45 has a growth side 47 and a shrinkage side 49. The template 52 also has various "alignment" hexagons H1–H11 placed at strategic locations on the template 52 with respect to the dual-size bull's eye pattern 45. In a properly formed hexagonal coded symbol area, the alignment hexagons of the template 52 according to the invention will line up with the orientation hexagons on the hexagonal coded symbol area.

The template 52 functions as a transparency, and is made of a material that allows for a substantially transparent surface. Such a material may be mylar, glass, or any other type of material that provides a substantially see-through property. The template 52 can be placed on top of a hexagonal coded symbol area to allow a user to visually determine if the basic size and orientation requirements and print quality for a hexagonal code have been satisfied.

FIG. 4 is not drawn to scale, since the alignment hexagons H1–H11 and dual-size bull's eye pattern 45 are each sized to line up with their counterparts (orientation hexagons) on the hexagonal coded symbol area. The hexagonal coded symbol area itself, which encompasses both the acquisition target and the honeycomb pattern, is typically about 1"×1" in size.

A maximum size overall hexagonal coded symbol area 65 and a minimum size overall hexagonal coded symbol area 75 are also shown on the template 52. These sizes 65, 75 are used to determine if the hexagons on the exterior portion of a hexagonal coded symbol area fall within the sizes 65, 75. If so, then the hexagonal coded symbol area meets the minimum/maximum size requirements. If not, then a defect exists and the area may not be scannable.

The dual-size bull's eye pattern 45 shown in FIG. 4 is an opposite-color version of an acquisition target 35 of FIG. 3. That is, the dual-size bull's eye pattern 45 on the template 52 has two dark-colored center half-circles 90, 90 abutted against each other, as can be seen from FIG. 4. The left-side half-circle 90' has a radius equal to the maximum allowable radius $r_{max}$, and the right-side half-circle 90 has a radius equal to the minimum allowable radius $r_{min}$.

The bull's eye pattern of the acquisition target 35 has a white-colored center circle 44, as can be seen from either FIG. 1 or FIG. 3. Also, each of the other concentric half-rings on the template 52 has an opposite color with respect to its corresponding concentric ring on the hexagonal coded symbol area. Referring now to FIGS. 2 and 4, the first concentric ring made up of half-rings 92, 92' on the template 52 is white, the first concentric ring 42 of the acquisition target 35 is black, the second concentric ring made up of half-rings 93, 93' of the template 52 is black, the second concentric ring 50 of the acquisition target 35 is white, etc.

By this arrangement, when the see-through template 52 is laid on top of the acquisition target 35 of a hexagonal coded symbol area 30 on a package, one can readily determine if any of the concentric rings making up the acquisition target 35 are within the size requirements imposed by the encoding scheme.

As can be seen from FIG. 4, the dual-size bull's eye pattern 45 on the mylar template 52 corresponds to two separate halves of different size bull's eye. The left-half 47, or shrinkage side, corresponds to a template for checking against a minimum allowable width for each of the concentric rings and the center circle making up a bull's eye acquisition target. The right-half 49, or growth side, corresponds to a template for checking against a maximum allowable width for each of the concentric rings and the center circle making up a bull's eye acquisition target.

As stated earlier, the alignment hexagons H1–H11 that are printed on the template 52 of FIG. 4 correspond to locations where orientation hexagons having black interiors must appear on every hexagonal coded symbol area. Also, in the first embodiment, the last concentric ring made up of half-rings 98, 98' is shown as being enclosed by a non-circular, polygonal outer surface 100. The outer surface 100 was chosen so that the dual-size bull's eye pattern 45 on the template 52 does not contact (or come close to contacting) any of the alignment hexagons H1–H11 on the template 52. Thus, when an operator is aligning the alignment hexagons H1–H11 on the template 52 with the orientation hexagons on a hexagonal coded symbol area, the dark colors of the dual-sized bull's eye 45 printed on the template 52 will not interfere with the alignment process.

Further, the polygonal-shaped outer surface 100 of the dual-sized bull's eye 45 on the template 52 is shaped such that certain exterior lines of the outer surface 100 are in a parallel relationship with respect to the minimum and maximum boundary lines 65, 75 that are also printed on the template 52. This also eases lining up the template 52 properly onto a hexagonal coded symbol area 30. Since the orientation hexagons on a hexagonal coded symbol area 30 are situated relatively close to the acquisition target 35 on the hexagonal coded symbol area 30, a non-circular outer surface 100 covering the largest pair of half-rings 98, 98' on the template 52 was chosen to reduce the possibility of having any interference between the bull's eye 45 and any of the alignment hexagons H1–H11 on the template 52.

The outer boundary 100 of the dual-sized bull's eye 45 on the template 52 need not necessarily have a polygonal shape. This outer boundary 100 could also be configured as a more faceted polygon, or as a thin black-colored ring encircling and abutting the white half-rings 98, 98' of the bull's eye 45, or as any other appropriate outer boundary that does not interfere with the alignment hexagons H1–H11 on the template 52.

Once the alignment hexagons H1–H11 are lined up properly with their counterparts (orientation hexagons) on the hexagonal coded symbol area 30, each of the concentric rings comprising the bull's eye acquisition target (35 of FIG. 1 and FIG. 3) are checked to see if they have a width that is greater than the minimum allowable width for a concentric ring and to see if they have a width that is less than the maximum allowable width of a concentric ring.

In FIG. 4, each of the alignment hexagons H1–H11 on the template 52 are shown with black lines forming their respective hexagonal boundaries. Each of the alignment hexagons H1–H11 also have a clear or transparent color (i.e., non-ink) interior region. Thus, when the template 52 is properly aligned on top of a hexagonal coded symbol area 30, the black-colored orientation hexagons of the hexagonal coded symbol area 30 will fill in the transparent interior regions of each of the alignment hexagons H1–H11 due to the see-through nature of the template 52.

Figure 5:
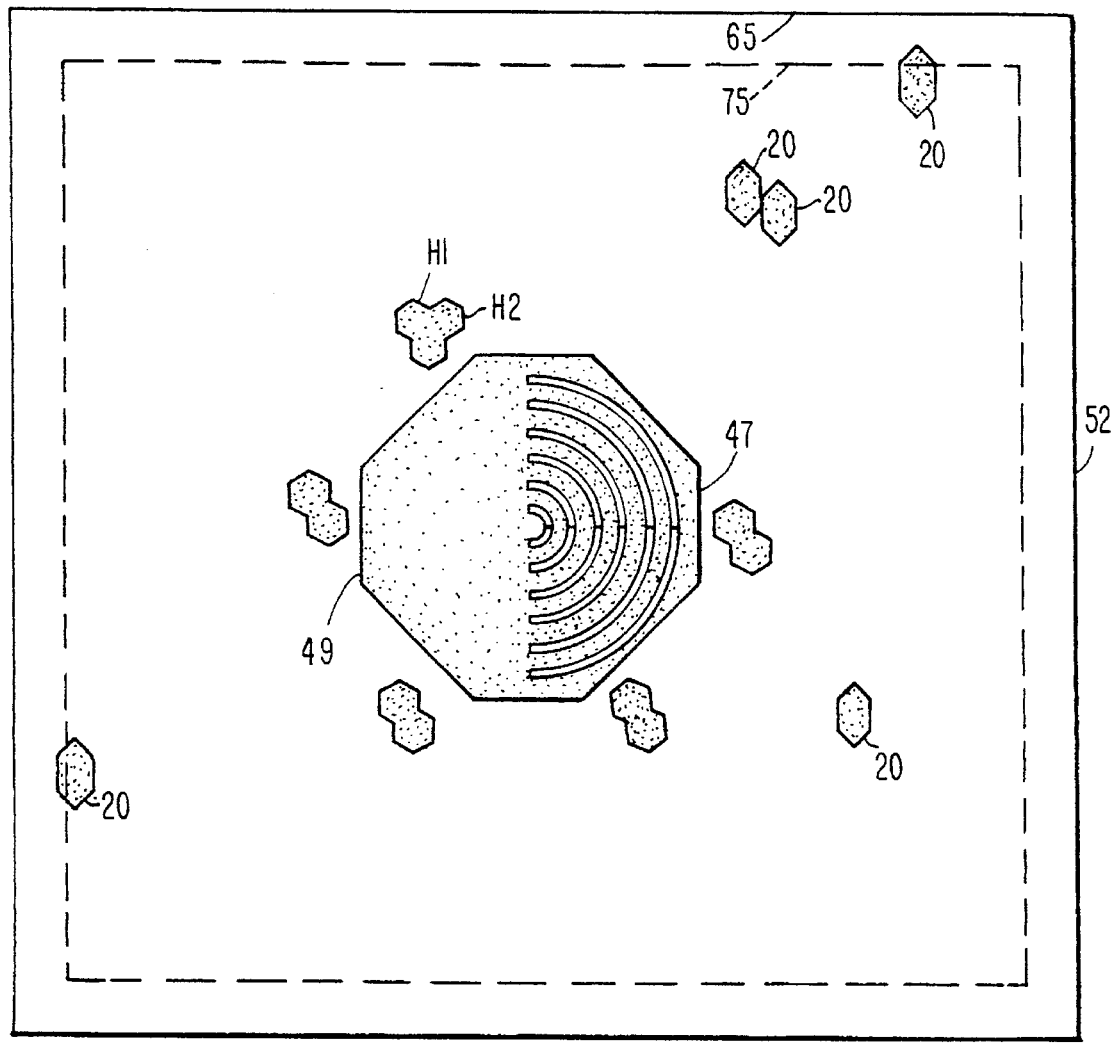
FIG. 5 shows the visual results of a template according to the first embodiment of the invention being placed over a properly sized label, with the viewing being made from above the template.

The mylar template 52 is also used to ensure that each of the concentric rings of the acquisition target 35 is properly spaced with respect to the center circle of the bull's eye acquisition target 35. FIG. 5 shows the result of a template 52 according to the first embodiment of the invention being placed over a properly-printed hexagonal coded symbol area, with the view being from above the template 52. For a bull's eye pattern on the hexagonal coded symbol area that meets the minimum/maximum size and position requirements of the UPS hexagonal-encoding scheme, a viewing of the left-half, or shrinkage side 49 of the bull's eye will show an all dark color, since the dark concentric rings of the acquisition target of the hexagonal coded symbol area would totally cover the white half-rings on the shrinkage side of the bull's eye on the template 52.

A viewing of the right-half, or growth side 47 of the bull's eye (45 of FIG. 4) will show a thin white concentric ring between each of a plurality of thick dark concentric half-rings, with each of the dark concentric half-rings corresponding to one of the dark rings (42, 46, 48 of FIG. 3) of the acquisition target (35 of FIG. 3). Since the white concentric half-rings (92, 94, 98 of FIG. 4) on the template 52 are sized so that they should be larger in width than the maximum allowable width of any of the concentric rings of the acquisition target (35 of FIG. 1 and FIG. 3), the dark concentric rings of the acquisition target 35 will not totally cover the white concentric half-rings (92, 94, 98 of FIG. 4) on the growth side 47 of the template 52 if the acquisition target 35 is properly printed.

Of course, the above discussion is based on the alignment hexagons H1–H11 of the template 52 first being properly placed directly on top of the orientation hexagons of the hexagonal coded symbol area. Once this is done, then each of the concentric rings of the bull's eye acquisition target is checked. This check can be performed either at normal magnification, as is done in the first embodiment of the invention, or at an enhanced magnification, such as 10× magnifying lens, as is done in a second and a third embodiment of the invention.

Referring again to FIG. 5, the view from above each of the alignment hexagons H1–H11 on the template 52 shows them having a dark interior due to their being aligned on top of the dark-colored alignment hexagons of the hexagonal coded symbol area. FIG. 5 also shows other encoded hexagons 20 that show through the see-through template 52. The placement of these hexagons 20 that form the encoded honeycomb pattern determines whether the minimum and maximum size requirements of the hexagonal coding scheme are met by using the boundaries 65, 75 on the template 52. In FIG. 5, since the outer hexagons 20 of the honeycomb pattern fall within the min/max range between the boundaries 65, 75, this encoded pattern meets the hexagonal coded symbol area requirement.

Figure 6:
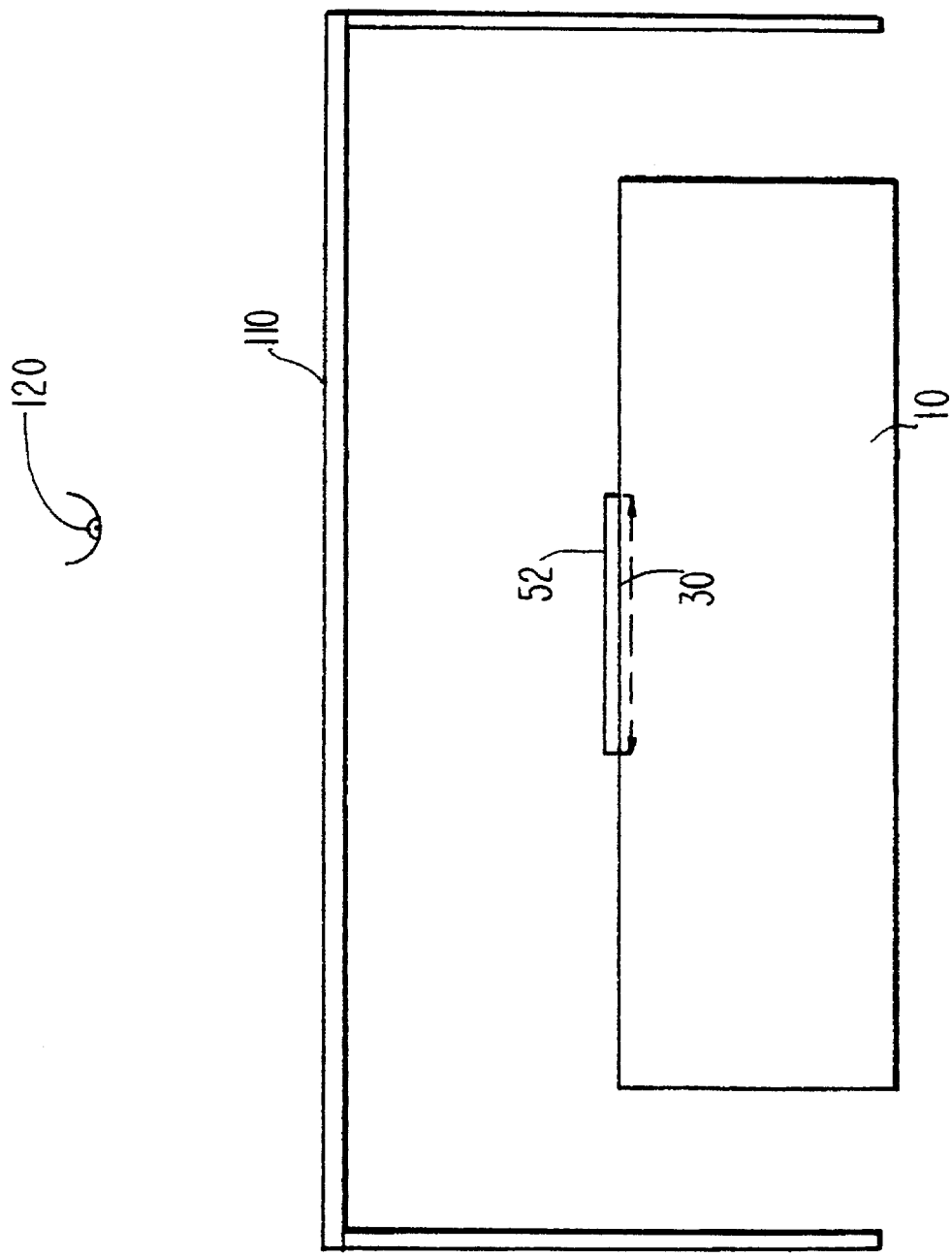
FIG. 6 shows a side view of a magnification lens being used to obtain a better viewing of the template on top of the label according to a second embodiment of the invention.

One possible magnification scheme is shown in FIG. 6, which shows a side view of an operator 120 checking a hexagonal coded symbol are 30 by placing the template 52 on top of the hexagonal coded symbol area 30 on the package 10. The operator 120 looks through a magnification lens 110 for both aligning the template 52 with the hexagonal coded symbol area 30 by using the alignment hexagons (H1–H11 of FIG. 4), and for checking to see if the hexagonal coded symbol area 30 fits within the specified sizes for both the allowable concentric circle widths and the maximum and minimum allowable hexagonal area size after the alignment has been made.

By using the system according to the invention, there is no need to extensively train an operator to perform this quality control function, since the template is easy to use and operate. Further, the alignment hexagons on the template allow for ease in placing the mylar surface correctly onto the hexagonal coded symbol area. This allows for a quick analysis of print gain and print loss, and for a quick analysis of overall symbol size at a low cost.

In a fast-paced conveyor environment in which a large number of packages need to have their symbol areas checked quickly and accurately, an operator can use the template to reliably determine if any packages on the conveyor belt have symbol areas that do not meet the specified hexagonal-code requirements. Also, by incorporating a dual-size bull's eye on the template, the operator can determine, at the same time, whether each of the concentric rings making up an acquisition target meets both the minimum and maximum allowable size and location requirements.

FIG. 7 provides details concerning the locations of the minimum and maximum boundaries (65, 75 of FIG. 4) that are imprinted on the template 52 according to the invention. FIG. 7 also lists the radiuses of each of the concentric rings for both the shrinkage side and the growth side of the bull's eye pattern on the template 52. These values are given with respect to a center point on the template 52 to the outer edge of each of the concentric rings. The center point reference conforms to the center point of the dual-size center circle 90, 90' on the template 52 (see FIG. 4). Also shown in FIG. 7 are ten times (10x) blown up dimensional sizes of these values, which are used to size a template according to a third embodiment of the invention, which will be described in more detail herein.

FIG. 8 shows a typical size of a hexagon 20 used to encode information in a standard hexagonal-coding scheme. The hexagon 20 is shown having a maximum height along the y-y axis of 0.040", and a maximum width along the x-x axis of 0.035". Each of the alignment hexagons H1 through H11 on the template 52 will have these exact dimensions.

FIG. 8 also shows the x-y coordinate locations of each of the alignment hexagons H1 through H11 that are printed onto the template 52 according to the invention.

FIG. 9 shows the pictorial locations of each of the alignment hexagons H1–H11 on the template 52. In FIG. 9, the bull's eye pattern is not shown in order to simplify this figure and to highlight the center point 75 of the template 52 from which each of the alignment hexagons H1–H11 are referenced from. Each alignment hexagon H1–H11 is placed onto a predetermined location on the template 52, with these predetermined locations corresponding to positions where the orientation hexagons must be located on each and every hexagonal coded symbol area.

According to a third embodiment of the invention, the printed images on the template 52' of the third embodiment correspond to a ten times blown-up version of the dual-sized bull's eye and the alignment hexagons H1–H11 of the template 52 used in either of the first and second embodiments. That is, the bull's eye pattern of the template 52' used in the third embodiment is ten times the size of the bull's eye pattern of the template 52 used in the first and second embodiments. Each of the alignment hexagons printed onto the template 52' of the third embodiment are ten times the size of its counterpart in the template 52 of the first and second embodiments. Of course, the relative size of the alignment hexagons with respect to the bull's eye is the same for each of the templates 52, 52'.

FIG. 10 shows the transparent template 52' of the third embodiment on top of a times ten (i.e., 10x) magnification lens 110, which itself is on top of a hexagonal coded symbol area 30 on a package 10. When looked at by an operator 120 from above, the hexagonal coded symbol area 30 will be magnified such that, if it is correctly imprinted onto the package 10, the alignment hexagons of the template 52' will match in size and location the magnified orientation hexagons of the hexagonal coded symbol area 30. Once this alignment has been made, then the magnified acquisition target of the hexagonal coded symbol area 30 can be compared against the larger-size bull's eye (as compared to the bull's eye used in the first embodiment) on the template 52'.

The third embodiment allows for ease in an operator 120 aligning the larger, magnified orientation hexagons of the hexagonal coded symbol area 30 with the larger sized alignment hexagons imprinted onto the template 52'. The template 52' of the third embodiment also allows for an easier comparison of the magnified acquisition target with the larger size, reverse-color, dual-size bull's eye imprinted onto the template 52'.

However, as can be seen from FIG. 10, in the third embodiment, the template 52' cannot directly abut the hexagonal coded symbol area 30, due to the magnification lens 110 situated between them. A slight problem may occur if the operator 120 misaligns the template 52' above the hexagonal coded symbol area 30, due to the spatial gap between the template 52' and the hexagonal coded symbol area 30. Therefore, it is important that the operator 120 look directly down upon these surfaces (i.e., in a perpendicular direction) during the alignment process.

With any of the embodiments as described herein, the print gain and print loss of the hexagonal coded symbol area can be easily determined. That is, as the hexagonal coded symbol area is created by a particular printing process, there may be a tendency for the acquisition target and the hexagons to spread out from their desired locations. This effect is a result of the bleeding of ink applied to the black-colored concentric rings and the black-colored hexagons. This bleeding may lead to an undesired growth of the black-colored hexagons and the black-colored concentric rings or a mis-shaped acquisition target. These effects could cause a misalignment with respect to the acquisition target. As previously noted, if the acquisition target such as the bull's eye 35 cannot be found or aligned, it may not be possible to accurately decode the symbol.

Use of the templates 52, 52' according to the invention allows one to easily check to determine if the lines making up the acquisition target are within specified size and location ranges. Thus one can easily determine if the printing process resulted in a symbol which complies with the specified requirements.

For both templates 52, 52', the view from the bottom side of the template would be the reverse (i.e., mirror) image of what is shown in FIG. 4, due to the see-through nature of the templates 52, 52'.

While preferred embodiments of the invention have been described herein, modification of the described embodiments may become apparent to those of ordinary skill in the art, following the teachings of the invention, without departing from the scope of the invention as set forth in the appended claims.

What is claimed is:

1. A template for use with an encoded symbol area having an acquisition target and an orientation target, said acquisition target including a first alternating pattern of contrasting colors and said orientation target including a first predetermined pattern of a predetermined color, comprising:

a substantially transparent sheet having a top surface and a bottom surface;

an acquisition pattern including a second alternating pattern of contrasting colors on said top surface of said substantially transparent sheet, said second alternating pattern having a contrasting color relationship with respect to said first alternating pattern;

an alignment pattern including said predetermined pattern of a second predetermined color, said second predetermined color having a contrasting color relationship with respect to said first predetermined color, wherein when said alignment pattern is aligned over said orientation target, said encoded symbol area is determined to comply with predetermined specifications when said acquisition target is at a same time aligned with said acquisition pattern.

2. A template according to claim 1, wherein said first predetermined color is one of white and black, said second predetermined color is an other of white and black, said first alternating pattern of contrasting colors are alternating white and black colors starting with white, and said second alternating pattern of contrasting colors are alternating black and white colors starting with black.

3. A template according to claim 2, wherein said acquisition target comprises:

a first center circle having a first color interior and a first predetermined radius; and a first concentric ring being contiguous with and surrounding said first center circle and having a second color interior and a predetermined ring width;

and wherein said acquisition pattern includes a dual-sized bull's eye having a left region and a right region, said acquisition pattern including, a first center half-circle in said left region having said second color interior and a second predetermined radius;

a second center half-circle in said right region having said second color interior and having a third predetermined radius, said first and second center half-circles being contiguous and together forming a second center circle having said second color interior and having a left side with said second predetermined radius and having a right side with said third predetermined radius;

a first concentric half-ring in said left region being contiguous with and surrounding said first center half-circle and having said first color interior and a second predetermined ring width;

a second concentric half-ring in said right region being contiguous with and surrounding said second center half-circle and having said first color interior and having a third predetermined ring width, wherein said first and second white concentric half-rings abut each other to form a dual-size concentric ring, said dual-size concentric ring having said second predetermined ring width on said left region and said third predetermined ring width on said right region;

and wherein when said alignment pattern is aligned over said orientation target, said encoded symbol area is determined to comply with the predetermined specifications when said first concentric ring having said second color interior totally covers said first concentric half-ring on said left region of said template, and said first concentric ring does not totally cover said second concentric half-ring on said right region of said template.

4. A template according to claim 1, further comprising:

a first pattern enclosing a first region which defines a maximum allowable area of said symbol area;

a second pattern enclosing a second region defining a minimum allowable area of said symbol area, wherein when said alignment pattern is aligned over said orientation target, said encoded symbol area is determined to comply with the predetermined specifications when said encoded symbol area falls outside of said second region and inside of said first region.

5. A template according to claim 4, wherein said orientation target comprises:

a predetermined number of hexagonal shapes having a first color interior and situated at predetermined locations with respect to said acquisition target;

said alignment pattern includes a predetermined number of hexagonal shapes having a second color interior and situated at predetermined locations with respect to said acquisition pattern;

and wherein said template is aligned with said encoded symbol area when each of said first color interiors of said predetermined number of hexagonal shapes of said orientation target match up with each of said second color interiors of said predetermined number of hexagonal shapes of said alignment pattern.

6. A template according to claim 5, wherein said first color interior is black.

7. A template according to claim 6, wherein said encoded symbol area is a square region and said orientation target includes a plurality of hexagonal shapes each having a black color interior, each of said hexagonal shapes of said orientation target being spaced at predetermined locations with respect to a geometric center of said square region to thereby form said first predetermined pattern;

and wherein said alignment pattern includes a plurality of hexagonal shapes each being defined by a black line enclosing a non-black interior region, said first and second regions each being square regions that share a geometric center, and said plurality of hexagonal shapes forming said alignment pattern being spaced at said predetermined locations with respect to said geometric center of said first and second regions.

8. A template according to claim 7, wherein said encoded symbol area includes a plurality of contiguous hexagonal shapes arranged in a honeycomb pattern surrounding said acquisition target, and wherein each of said respective interior regions of said plurality of contiguous hexagonal shapes has one of a first color and a second color.

9. A template according to claim 8, wherein said first color is a non-black color and said second color is black.

10. An apparatus for testing an encoded symbol area having an acquisition target and an orientation target, said acquisition target including a first alternating pattern of contrasting colors and said orientation target including a first predetermined pattern of a predetermined color, comprising:

a template constructed from a material having a substantially transparent color characteristic, said template having a top surface and a bottom surface, said template further including, an acquisition pattern including a second alternating pattern of contrasting colors on said top surface, said second alternating pattern having a contrasting color relationship with respect to said first alternating pattern;

an alignment pattern including said predetermined pattern of a second predetermined color, said second predetermined color having a contrasting color relationship with respect to said first predetermined color; and magnification means for providing a predetermined amount of magnification;

wherein when said alignment pattern of said template is aligned over said orientation target of said encoded symbol area by an operator using said magnification means to align said template on said encoded symbol area, and wherein said encoded symbol area is determined to comply with predetermined specifications when said acquisition target is at a same time aligned with said acquisition pattern.

11. An apparatus according to claim 10, wherein said predetermined amount of magnification is about 10.

12. An apparatus according to claim 10, wherein said material is one of mylar and glass.

13. A template according to claim 10, wherein said first predetermined color is one of white and black, said second predetermined color is an other of white and black, said first alternating pattern of contrasting colors are alternating white and black colors starting with white, and said second alternating pattern of contrasting colors are alternating black and white colors starting with black.

14. A template according to claim 10, wherein said acquisition target comprises:

a first center circle having a first color interior and having a first predetermined radius; and a first concentric ring being contiguous with and surrounding said first center circle and having a second color interior and a predetermined ring width;

and wherein said acquisition pattern includes a dual-sized bull's eye having a left region and a right region, said acquisition pattern further including, a first center half-circle in said left region having said second color interior and a second predetermined radius;

a second center half-circle in said right region having said second color interior and a third predetermined radius, said first and second center half-circles being contiguous and together forming a second center circle having said second color interior and having a left side with said second predetermined radius and a right side with said third predetermined radius;

a first concentric half-ring in said left region being contiguous with and surrounding said first center half-circle and having said first color interior and a second predetermined ring width;

a second concentric half-ring in said right region being contiguous with and surrounding said second center half-circle and having said first color interior and a third predetermined ring width, wherein said first and second white concentric half-rings abut each other to form a dual-size concentric ring, said dual-size concentric ring having said second predetermined ring width on said left region and having said third predetermined ring width on said right region;

and wherein when said alignment pattern is aligned over said orientation target, said encoded symbol area is determined to comply with the predetermined specifications when said first concentric ring totally covers said first concentric half-ring on said left region of said template, and said first concentric ring does not totally cover said second concentric half-ring on said right region of said template.

15. A template according to claim 10, further comprising:

a first pattern enclosing a first region which defines a maximum allowable area of said encoded symbol area;

a second pattern enclosing a second region defining a minimum allowable area of said encoded symbol area, wherein when said alignment pattern is aligned over said orientation target, said encoded symbol area is determined to comply with the predetermined specifications when said encoded symbol area falls outside of said second region and inside of said first region.

16. A template according to claim 10, wherein said orientation target comprises:

a predetermined number of hexagonal shapes having a first color interior and situated at predetermined locations with respect to said acquisition target;

said alignment pattern includes, a predetermined number of hexagonal shapes having a second color interior and situated at predetermined locations with respect to said acquisition pattern, and wherein when said template is aligned with said encoded symbol area when each of said first color interiors of said predetermined number of hexagonal shapes of said orientation target match up with each of said second color interiors of said predetermined number of hexagonal shapes of said alignment pattern.

17. A template according to claim 16, wherein said first color interior is black, and said second color interior is a non-black color.

18. A template according to claim 14, wherein said encoded symbol area is located in a square region and said orientation target includes a plurality of hexagonal shapes each having a black color interior, each of said hexagonal shapes of said orientation target being spaced at predetermined locations with respect to a geometric center of said square region to thereby form said first predetermined pattern;

and wherein said alignment pattern includes a plurality of hexagonal shapes each being defined by a black line enclosing a white interior region, said first and second regions each being square regions that share a geometric center, and said plurality of hexagonal shapes forming said alignment pattern being spaced at said predetermined locations with respect to said geometric center of said first and second regions.

19. A template according to claim 16, wherein said encoded symbol area includes a plurality of contiguous hexagonal shapes arranged in a honeycomb pattern surrounding said alignment target, and wherein each of said respective interior regions of said plurality of contiguous hexagonal shapes has one of a first color and a second color.

20. A template according to claim 19, wherein said first color is a non-black color and said second color is black.

21. An apparatus for testing an encoded symbol area having an acquisition target and an orientation target, said acquisition target having a first size and including a first alternating pattern of contrasting colors, and said orientation target having a second size and including a first predetermined pattern of a predetermined color, comprising:

magnification means for providing a predetermined amount of magnification;

a template constructed from a material having a transparent color characteristic, said template having a top surface and a bottom surface, said template further including, an acquisition pattern including a second alternating pattern of contrasting colors on said top surface of said transparent sheet, said second alternating pattern having a contrasting color relationship with respect to said first alternating pattern and having a third size greater than said first size such that, when said first size is magnified by said predetermined amount of magnification, said third size equals said first size;

an alignment pattern including said predetermined pattern of a second predetermined color, said second predetermined color having a contrasting color relationship with respect to said first predetermined color, said alignment pattern having a fourth size greater than said second size such that, when said second size is magnified by said predetermined amount of magnification, said fourth size equals said second size; and wherein when said alignment pattern of said template is aligned over said orientation target with said magnification means situated between said template and said encoded symbol area, said encoded symbol area is determined to comply with predetermined specifications when said acquisition target is at a same time aligned with said acquisition pattern.

22. An apparatus according to claim 21, wherein said predetermined amount of magnification is about 10.

23. An apparatus according to claim 21, wherein said material is one of mylar and glass.

24. A template according to claim 21, wherein said first predetermined color is one of a non-black color and black, said second predetermined color is an other of the non-black color and black, said first alternating pattern of contrasting colors are alternating white and black colors starting with white, and said second alternating pattern of contrasting colors are alternating black and white colors starting with black.

25. A template according to claim 21, wherein said acquisition target comprises:

a first center circle having a first color interior and having a first predetermined radius; and a first concentric ring being contiguous with and surrounding said first center circle and having a second color interior and a predetermined ring width;

and wherein said acquisition pattern includes a dual-sized bull's eye having a left region and a right region, said acquisition pattern including, a first center half-circle in said left region having said second color interior and a second predetermined radius;

a second center half-circle in said right region having said second color interior and having a third predetermined radius, said first and second center half-circles being contiguous and together forming a second center circle having said second color interior and having a left side with said second predetermined radius and a right side with said third predetermined radius;

a first concentric half-ring in said left region being contiguous with and surrounding said first center half-circle and having said first color interior and a second predetermined ring width;

a second concentric half-ring in said right region being contiguous with and surrounding said second center half-circle and having said first color interior and a third predetermined ring width, wherein said first and second concentric half-rings abut each other to form a dual-size concentric ring, said dual-size concentric ring having said second predetermined ring width on said left region and said third predetermined ring width on said right region;

and wherein when said alignment pattern is aligned over said orientation target, said encoded symbol area is determined to comply with the predetermined specifications when said first concentric ring totally covers said first concentric half-ring on said left region of said template, and said first concentric ring does not totally cover said second concentric half-ring on said right region of said template.

26. A template according to claim 21, further comprising:

a first pattern enclosing a first region which defines a maximum allowable area of said encoded symbol area;

a second pattern enclosing a second region defining a minimum allowable area of said encoded symbol area, wherein when said alignment pattern is aligned over said orientation target, said encoded symbol area is determined to comply with the predetermined specifications when said encoded symbol area falls outside of said second region and inside of said first region.

27. A template according to claim 21, wherein said orientation target comprises:

a predetermined number of hexagonal shapes having a first color interior and situated at predetermined locations with respect to said acquisition target, said alignment pattern includes a predetermined number of hexagonal shapes having a second color interior and situated at predetermined locations with respect to said acquisition pattern, and wherein when said template is aligned with said encoded symbol area when each of said first color interiors of said predetermined number of hexagonal shapes of said orientation target are matched up with each of said second color interiors of said predetermined number of hexagonal shapes of said alignment pattern.

28. A template according to claim 27, wherein said first color interior is black, and said second color interior is a non-black color.

* * * * *